US011975239B2

(12) United States Patent
Kennedy (10) Patent No.: US 11,975,239 B2
(45) Date of Patent: May 7, 2024

(54) VIRTUAL COMPETITIVE EVENT MANAGEMENT SYSTEM WITH RESULT VALIDATION

(71) Applicant: ChallengeRunner LLC, Cincinnati, OH (US)

(72) Inventor: Joseph Kennedy, Hamilton, OH (US)

(73) Assignee: ChallengeRunner LLC, Cincinnati, OH (US)

( * ) Notice: Subject to any disclaimer, the term of this patent is extended or adjusted under 35 U.S.C. 154(b) by 607 days.

(21) Appl. No.: 17/229,385

(22) Filed: Apr. 13, 2021

(65) Prior Publication Data
US 2021/0322829 A1   Oct. 21, 2021

Related U.S. Application Data

(60) Provisional application No. 63/010,861, filed on Apr. 16, 2020.

(51) Int. Cl.
*A63B 24/00* (2006.01)
*G06F 21/32* (2013.01)
*H04W 4/02* (2018.01)
*H04W 4/029* (2018.01)

(52) U.S. Cl.
CPC ...... *A63B 24/0084* (2013.01); *A63B 24/0062* (2013.01); *G06F 21/32* (2013.01); *H04W 4/027* (2013.01); *H04W 4/029* (2018.02); *A63B 2230/04* (2013.01)

(58) Field of Classification Search
CPC ........... A63B 2230/04; A63B 24/0062; A63B 24/0084; G06F 21/32; G06F 21/35; G06Q 10/02; H04L 63/0853; H04W 4/027; H04W 4/029
See application file for complete search history.

(56) References Cited

U.S. PATENT DOCUMENTS

| | | | |
|---|---|---|---|
| 9,189,613 B1 * | 11/2015 | Tuthill | G06Q 20/40 |
| 10,300,334 B1 * | 5/2019 | Chuang | G16H 50/30 |
| 2012/0316456 A1 * | 12/2012 | Rahman | G06F 3/0346 600/300 |
| 2014/0244010 A1 * | 8/2014 | Harvey | A63K 3/00 700/91 |

(Continued)

*Primary Examiner* — Justin L Myhr
(74) *Attorney, Agent, or Firm* — Frost Brown Todd LLP; Vance V. VanDrake, III; Alexander J. Johnson (57) ABSTRACT

A server is configured to manage a network of participant devices that are distributed across a plurality of participants in a virtually managed competitive event. Events may be configured and offered via the platform, and participants that have devices meeting certain requirements may register for events. Events that have a high goal for accuracy and verifiability may require a smartphone and smartwatch to be possessed and worn throughout the event in order to gather GPS data, step count, heart rate, fingerprint data, facial recognition images, and other verification data before, during, and after the event. Where data cannot be verified and indicates a technical error or falsification of data, participants may be warned, and their results may be flagged to indicate that they are not verifiable and may be erroneous. Event results may be provided for a plurality of participants with information indicating the accuracy and verifiability of individual results.

19 Claims, 7 Drawing Sheets

(56) References Cited

U.S. PATENT DOCUMENTS

| | | | |
|---|---|---|---|
| 2016/0029158 A1* | 1/2016 | Hansen | H04W 4/027 455/456.1 |
| 2018/0085628 A1* | 3/2018 | Werner | G16H 40/63 |
| 2020/0061442 A1* | 2/2020 | Galli | A63K 3/00 |
| 2021/0383430 A1* | 12/2021 | Chijimatsu | A63F 13/65 |

* cited by examiner

VIRTUAL COMPETITIVE EVENT MANAGEMENT SYSTEM WITH RESULT VALIDATION

PRIORITY

This application claims the priority of U.S. Provisional Patent 63/010,861, filed Apr. 16, 2020, and titled "Virtual Competitive Event Management System with Result Validation," the entire disclosure of which is incorporated herein by reference.

FIELD

The disclosed technology pertains to a system for virtually managing and validating the results of events such as bike and foot races.

BACKGROUND

Competitive running is a popular activity with tens of thousands of events occurring across the United States each year, including 5k, 10k, and 15k runs, as well as marathons, triathlons, and other events. Other timed competitive events are also popular and may include events based around swimming, cycling, rowing, and skiing, for example. These events and activities provide a variety of benefits for both sponsors and participants, as they provide opportunities to improve health and fitness, and often raise money for beneficial causes such as research into heart health, cancer treatment, or treatment of prenatal conditions.

Organizing and executing these events is a major undertaking, and often requires a number of roadways to be shut down to vehicle traffic and marked to indicate the course. This requires extensive and precise coordination with local government and law enforcement as well as with participants. As a result, it can be very challenging for these types of events to adapt to unforeseen circumstances that might cause a delay or require a course change. As an example, where sudden changes to weather conditions, course conditions, or health and safety conditions (e.g., such as the COVID-19 pandemic) threaten the safety of participants in an event, the event may be at risk of being canceled entirely instead of rescheduled to another day or location. Cancellation of these events can be disappointing for participants that have been training in anticipation of competition and can cause extreme financial distress of event organizers and beneficiaries.

What is needed, therefore, is an improved system for virtually managing competitive events.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventor has conceived of novel technology that, for the purpose of illustration, is disclosed herein as applied in the context of virtual event management. While the disclosed applications of the inventors' technology satisfy a long-felt but unmet need in the art of virtual event management, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

I. Virtual Race Management System

In the wake of the COVID-19 pandemic thousands of public events have been canceled, including a number of competitive events such as marathons that are held annually and draw participants from all over the world. While many competitive events are directed at more casual participants (e.g., such as superhero themed 5k runs or other "fun-runs"), many events are treated very seriously by event administrators and have a high level of verification and validation of results. This is especially true for events that may be used as qualifiers for other high-level events, or that may provide prizes and sponsorship opportunities for high qualifiers. Many such events may position attendees around the course to watch for attempts to take shortcuts or otherwise unfairly influence results, or may position sophisticated tracking systems about the course to track beacons that are distributed to participants and attached to a shoe or sleeve. The need for validation of results and the complexity of arranging the required personnel and hardware makes it very difficult to modify the route or modify the day and time of the event while maintaining high confidence in results.

Figure 1:
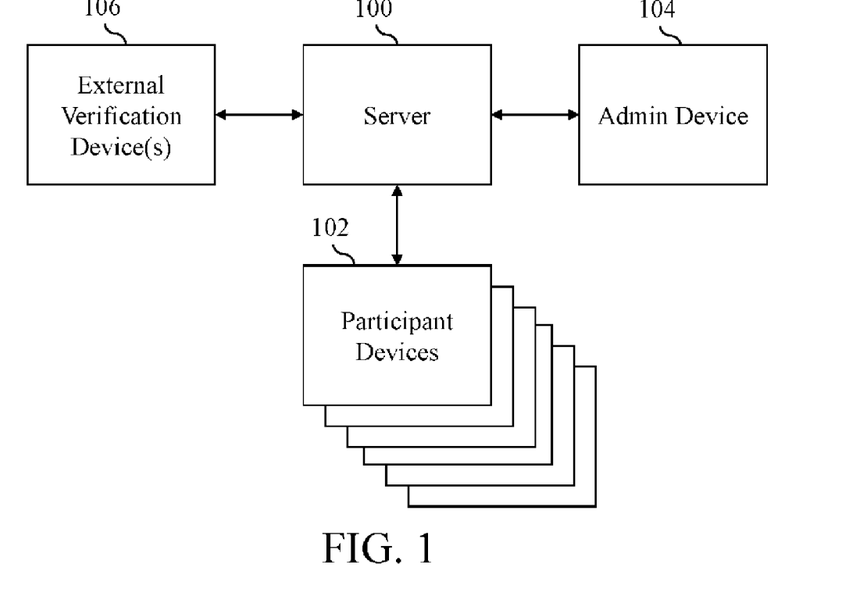
FIG. 1 is a schematic diagram of an exemplary system configured to virtually manage a competitive event for a plurality of participants.

FIG. 1 shows an exemplary system that may be configured to virtually manage a competitive event for a plurality of participants. Varying implementations of the system may include one or more features to aid in managing a competitive event virtually so that race administrators do not need to physically mark a course, gather at the race location, or provide physical race packets (e.g., usually including a race number and wireless beacon for tracking progress) to participants. Virtual management may also allow for participants to self-select the day and time of their participation, or may allow for participant slots on particular days and times to be assigned across participants in order to minimize the number of participants on the course at any given time. This may be useful where, for example, it is desirable to have 100 participants compete in the event each day over a 10-day period, rather than having 1000 participants compete in the event on a single day.

While virtual event management can completely replace physical event management in some cases, it can also be used to augment conventional approaches to physical event management by providing additional features and flexibility to quickly convert the event to partial or complete virtual management (e.g., an event may be planned for participants to compete at the same time and location using conventional wireless beacons, but in the event of an emergency may be easily switched to completely virtually managed with participants being assigned to different locations or assigned to different participant slots at different times to minimize the number of simultaneous participants).

The system of FIG. 1 includes a server (100), a plurality of participant devices (102), an administrator device (104), and in some implementations may include one or more external verification devices (106). The server (100) may include one or more physical, virtual, and cloud servers, each including or utilizing processors, memories, network adapters, hard disks, and other components as will be apparent to those of ordinary skill in the art in light of this disclosure. The administrator device (104) may be a computer, mobile device, or other computing device capable of interfacing with the server (100) and virtual event management platform via a web browser, software application, or other software interface. The administrator device (104) may be used to configure events, review and modify participant records, review and modify result records, and for other interactions with the server (100) and platform.

The participant devices (102) may include smartphones or other mobile devices, smartwatches, fitness trackers, wireless chest heart rate monitors, handheld GPS receivers, and other mobile devices that can provide data related to a participants location, physiological state, biometric information, or other information, as will be described in more detail below. Each participant may have one or more participant devices (e.g., one participant may only have a smartphone, while another may have a smartphone and a smartwatch). The participant devices (102) are in communication with the server (100), directly or indirectly, via software applications, software interfaces, web services, web browsers, or other similar communication interfaces. As an example, one participant may have a smartphone that is directly in communication with the server (100) via a cellular data network. Another participant may have a smartwatch that is in communication with a smartphone, which itself is in communication with the server (100), allowing for indirect communication between the smartwatch and the server (100). Another participant may have a wearable device that monitors heart rate, and that may communicate with the server (100) when it is coupled to a personal computer (e.g., such as when the wearable device is charging or connected via USB). Numerous combinations of participant devices (102) exist and may communicate with the server (100) in various ways, as will be apparent to those of ordinary skill in the art in light of this disclosure.

The external verification devices (106) may include any devices that are not, relative to a particular participant, a participant device, but that are configured to interact with that participant or that participant's participant devices (102) in some way. This could include, for example, a wireless network router placed along the course and configured to briefly communicate with participant devices (102) when they are within a certain proximity of the router, which can provide validation of the participant's location at a certain time. This could also include, for example, a participant device for a first participant communicating with a participant device for a second participant (e.g., each participant device would be an external verification device relative to the other), which can also provide validation of the participant's location at a certain time.

In some implementations, it can be seen that an event can be virtually managed and conducted with very little setup by event administrators (e.g., external verification devices (106) are not required or may double as participant devices), as each participant bring their own participant devices (102) which may communicate with the server (100) to create a temporary edge computing environment for each virtually managed event. In other words, each participant device (102) locally gathers and processes data associated with tracking event results, and when possible transmits some or all of that data to the server (100) which may perform additional processing and validation, may distribute event updates and feedback or event results, or some or all of the above. The flexibility provided by this network of participant devices (102) allows for events to be managed via the server (100) such that event times, courses, and other characteristics may be quickly changed and communicated to all participants, which may allow events to be adapted to emergencies or changing circumstances without being canceled. The network or participant devices (102) also allows for varying levels of validation to be performed for event results, as will be described in more detail below.

Figure 2:
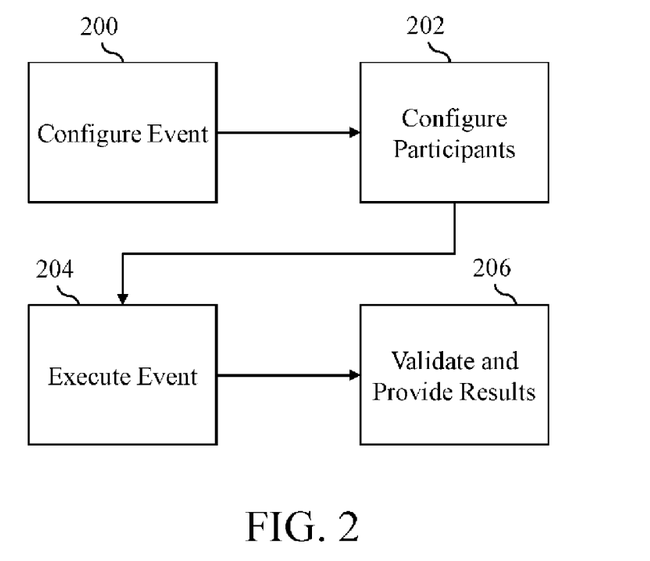
FIG. 2 is a high-level flowchart of a set of steps that may be performed by the system of FIG. 1 to manage an event.

FIG. 2 shows a high-level flowchart of a set of steps that may be performed by the system of FIG. 1 to manage an event. An event may be configured (200) on the server (100), which may include, for example, setting a description of the event, setting a route and time, indicating how the event should be communicated to prospective participants, and setting any participant device or validation requirements for participating in the event. Participants may then be configured (202) for the event, which may include receiving requests from participants to register for the event, validating that the participant is able to meet any requirements for the event (e.g., such as verifying that the participant's devices (102) have the required capabilities), and communicating event information to participants such as the time and location of their event. The system may then execute (204) the event, which may include allowing users that have been configured for an event begin the event, receiving data from participants as the event begins and while it is ongoing, providing feedback and other contextual information to participants during the event, and validating event data to ensure that participants are being properly tracked and are not attempting to unfairly influence the results. As the event ends, or as each participant completes the event, the system may perform additional validation (206) of event data and provide results of the event to participants and/or the public (e.g., via a website, application, email communication).

Figure 3:
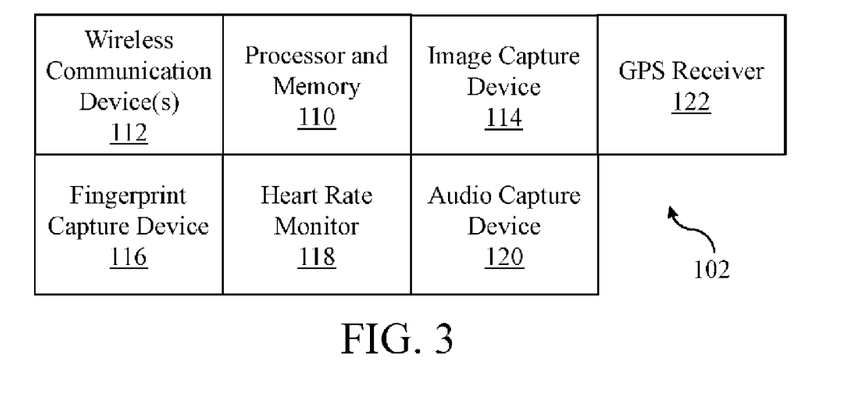
FIG. 3 is a schematic diagram of a participant device for use with the system of FIG. 1.

As has been described, an advantageous aspect of the system is the ability to establish a temporary network or participant devices (102) and other devices that can be used to produce and track event data which may be used to validate participant's performance during the event, after the event, or both. While a number of examples of participant devices (102) have been described, FIG. 3 shows schematic diagram of a set of features or components that may be present in one or more of the participant devices (102) associated with a participant. These capabilities may be embodied in a single device (e.g., a smartphone) or distributed across several devices (e.g., a smartphone and a smartwatch or other wearable device). The participant device (102) of FIG. 3 includes a processor and memory (110), a wireless communication device (e.g., a transceiver for cellular data, Wi-Fi, Bluetooth, etc.), an image capture device (114) (e.g., a camera capable of capturing images and/or video), a fingerprint capture device (116), a heart rate monitor (118), an audio capture device (120), a GPS receiver (122), as well as other typical components (e.g., a display, a user interface such as a touchscreen, a battery, a speaker). One or more of the participant devices (102) may be configured with software that allows communication with the server (100), such as a mobile software application or other software interface.

Figure 4:
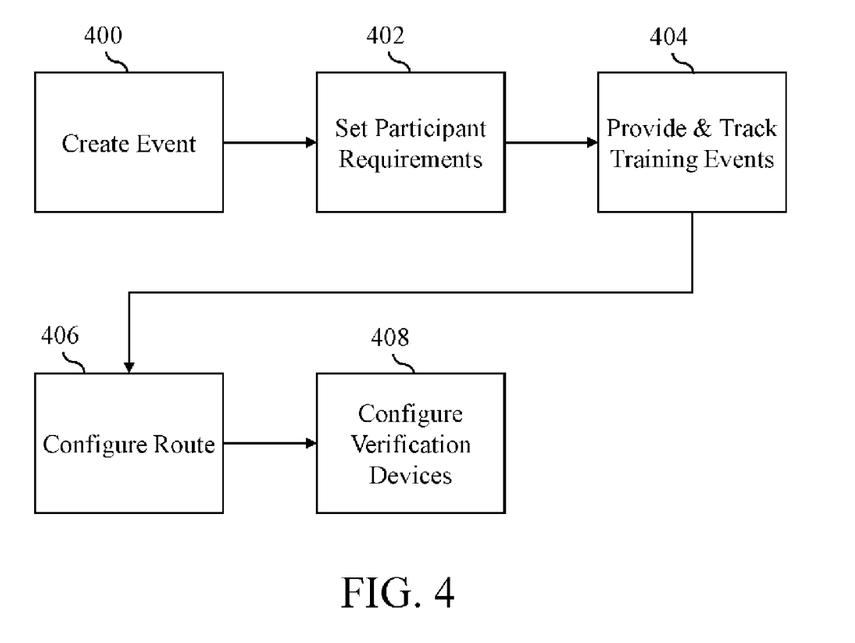
FIG. 4 is a flowchart of a set of steps that could be performed to create a virtually managed event.

Various capabilities of the participant devices (102) such as those described above may be relied upon to validate participant's event data and ensure the accuracy of results. FIG. 4 is a flowchart of a set of steps that could be performed to create a virtually managed event and specify such configurations and others. An event may be created (400) on the server (100) including basic details such as a name, description, any associated organizations, contact information, and other general information. One or more participant requirements may be configured (402) for the event. Participant requirements may be configured such that they all must be met by a participant before registering for the event, or may limit the type of registration available for the event. As an example, an event seeking a high level of validation and result accuracy may require that each participant possess a smartphone and wear a smartwatch during the event, and may gather location, physiological, and biometric information that may be used to verify that the participant's event data is being accurately reported, and that the participant is not attempting to deceive the system. Alternately, a more casual event may have only very basic, or even no participant device requirements, and may allow participant's to self-report results via a website after the event. As yet another example, some events may allow participants to register at varying levels of validation (e.g., high, moderate, low or none) and may provide or filter the results in varying ways depending upon the trust level (e.g., a group of participants with a low trust level may be described as unverified).

The event may also be configured so that the system provides (404) and tracks training events on a set schedule leading up to the actual event. Training events may provide routes similar to the route of the actual event, and may allow users to familiarize themselves with the platform's features prior to the actual event. Data collected during training events may also be stored and associated with participants, and may be used to validate later event results (e.g., identify participant's whose performance changes drastically during the actual event), to provide estimates of participant performance during the actual event, and for other uses.

The event may also be configured (406) to include a route. A route may be configured (406) in varying ways. A route may be configured (406) as a required route (e.g., required for high trust users, or required for all users) including a starting point and stopping point, as well as turn-by-turn directions through a city, along streets, or through other geography. When a route is required for some or all participants in an event, the system will require that the affected participant's follow the configured route during the event, and may penalize or even discard their results if they do not follow the required route. Where a route is configured as a required route, the system may automatically distribute all participant's starting times over a number of days and times in order to minimize the number that are competing in parallel (e.g., 100 users per day over ten days).

Routes may also be configured (406) as comparable routes, where the exact route is not required, but participant's still must use a route that is comparable to a configured default route in one or more ways. As an example, an event creator may provide route data to the system indicating a starting point, finishing point, and turn-by-turn directions in between. Depending upon the event configurations, each individual participant may either choose a route of their own that is comparable to the default route in one or more ways, or may request that the system automatically generate a comparable route using roadways that are proximate to that participant.

In some implementations and configurations, a user selected route may be acceptable if it is substantially the same overall distance as the default route that it is compared to. Alternately, the system may automatically identify a comparable route that is near the participant's zip code or other location information using geographic map, road, and navigation data and may assign or suggest that route to the participant.

Other implementations may be configured to provide for rigorous requirements for comparable routes. As an example, in some implementations and configurations, a user selected route may be acceptable if it is substantially the same overall distance as the default route that it is compared to, but may also be required to be at a similar altitude, have similar changes in altitude throughout the route (e.g., where a default route is hilly and requires participant's to ascend several hundred feet throughout the route, the comparable route selected by the user must have substantially the same changes in altitude), or pass through certain locations (e.g., such as passing by a shopping center in a nearby city where an external verification device (106) may be placed). Alternately, the system may automatically identify a more rigorously comparable route based on the participant's location information, and may assign or suggest that route to the participant.

Varying route types and requirements may be configured as described above, and may determine whether any individual participant can compete as a high trust, moderate-trust, or low-trust participant. As an example, high trust participant's may all be required to utilize the same required route, or may be required to accept a rigorously comparable automatically generated route. Conversely, low-trust participant's may be able to participate in some events when self-selecting a route based only on comparable distance, but may be barred entirely from other events that have more rigorous requirements.

Configuring the event may also include configuring (408) one or more external verification devices (106) to be used to aid in validation of event data and participant results. This may include configuring the system to cause participant devices (102) to validate each other's location when possible, configuring the system to use a camera or Wi-Fi router positioned at a shared route point that many participants will pass by during the event, or configuring other devices that can detect the participant device or be detected by the participant device and report such detections to the server (100).

Figure 5:
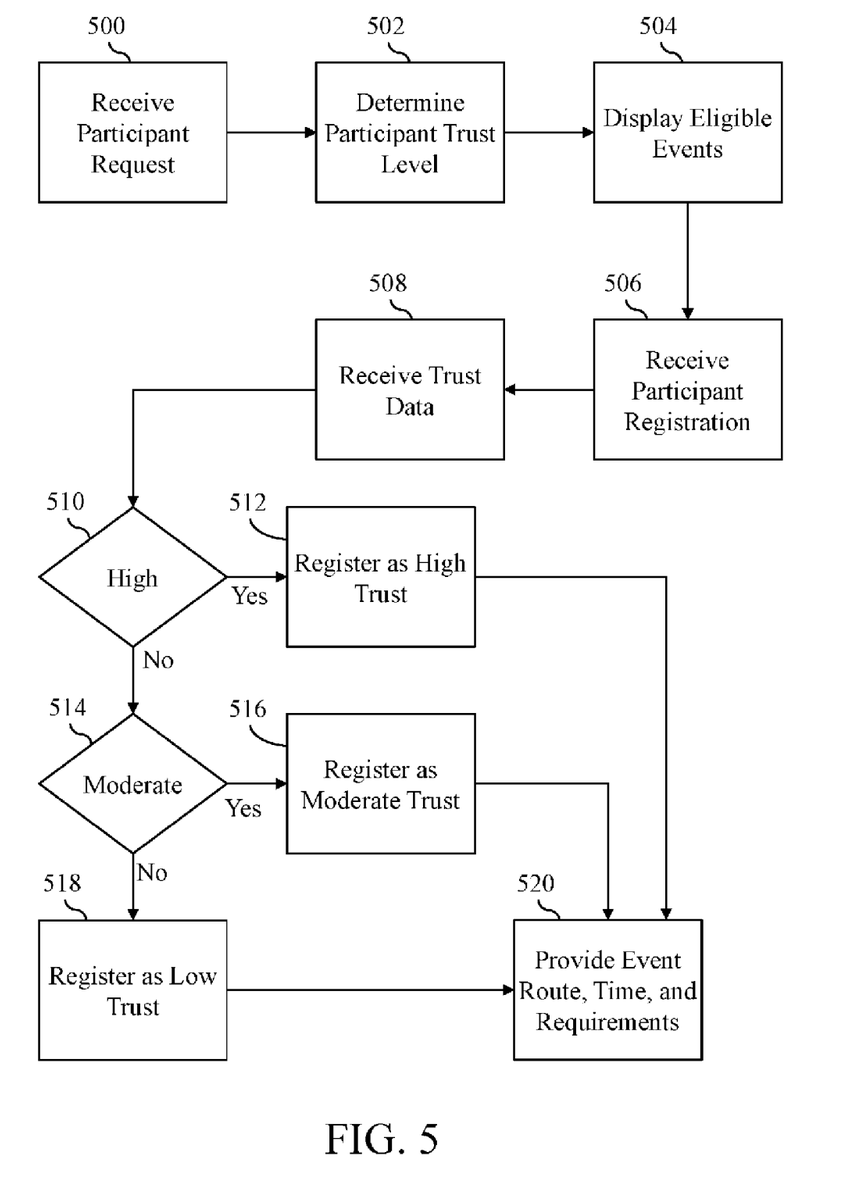
FIG. 5 is a flowchart of a set of steps that could be performed to register participants for a virtual event.

In some implementations of the system, high trust validation may come into play and be enforced upon participant's starting at the registration process. As an example, FIG. 5 shows a flowchart of a set of steps that could be performed to register participants for a virtual event. Initially, a participant may request to register (500) with the virtual management platform by creating a user account and providing other basic information describing their location, name, and other vital event statistics (e.g., age, gender, per-mile pace). This initial registration with the platform may occur via the participant's smartphone, smartwatch, or other potential participant device (102). As the participant is being configured, the system may poll the capabilities of the participant's devices in order to determine (502) what sort of trust level the participant is able to comply with for purposes of generating event data that is usable to validate their results.

As an example, a participant that registers with a modern smartphone and smartwatch may be classified by the system as high trust, since the system will be able to gather location information from the smartphone GPS, speed and altitude information from either device, and heart rate information from the smartwatch, and is likely maintain a constant cellular data connection throughout the event in order to provide event data in real time. A participant that registers using a smartphone that is known to have an unreliable and/or inaccurate GPS function, or that is known to have unreliable cellular data connections in the area of the event may be classified as low trust, since the system may only have access to unreliable event data from the participant, and may be limited to only collecting such data sometime after the event ends and the user is able to connect to a reliable network.

The system may then display (504) any events that the participant is eligible for based on their determined (502) trust level. Event eligibility may be based on other factors beyond trust, such as whether the event is publicly open, whether it is a private event that the participant has been invited to by their employer or a friend, whether a usable route for the event is located within the participant's search threshold (e.g., the required route or a comparable route is available within 25, 50, 100 miles, etc.), or based upon other factors. A participant may then register for an eligible event. When a registration is received (506) by the system, the system may require additional information from the user at the time of registration depending upon the configured requirements for the event. As an example, events requiring high validation and trust of results may require that the user provide various trust data that is received (508) by the system and is used to establish certain baseline information that may be used for later validation. This could include requiring the participant to associate a fingerprint or facial recognition image with their registration, or may require that the participant perform one or more training exercises with their participant devices (102) to establish baseline performance metrics and their association with heart rate or other physiological factors. As will be described in more detail below, such baseline trust data may be used through execution of the actual event to confirm the identity of the participant and ensure that they are not substituting out competitors in an attempt to falsify event data and results.

As has been described, some events may allow participants to compete at varying levels (e.g., high trust, moderate trust, low trust) based upon their participant device (102) capabilities, received trust data (508), or both. Though it should also be understood that these are exemplary categories only, and some events may require all participants to be high trust, or may provide less than three, or more than three varying trust categories. In an implementation supporting three categories, the system may analyze the trust data and determine whether the participant meets a high (510) or moderate (514) trust threshold. Where a high threshold is met (510), the participant may be registered (512) as a high trust participant. Where a moderate threshold is met (514), the participant may be registered (516) as a moderate trust participant. Otherwise, the participant may be registered (518) as a low trust participant. When a participant is registered at any level, the system may provide (520) various event details based upon their registration such as the event route, time, and participant device requirements that must be met during the event to maintain that trust level, and any other requirements.

As an example, a participant registered (512) as high trust might be provided (520) a route that is required for all high trust participants, and may be assigned a day and time to begin the event that is selected to minimize the number of parallel participant's along that required route. Such users may also be provided (520) information indicating that they must carry or wear the same participant devices that they registered with throughout the event, and that they may be required to provide additional trust data (e.g., biometric or physiological information) via the participant devices during and after the event in order to verify their identity.

As another example, a participant registered (518) as low trust might be provided (520) a suggested comparable route having the same overall distance as a default route, and may be provided information indicating that they should carry a participant device configured with the software application during the event. As can be seen, the system is capable of being configured to provide any number of different experiences to different participants as may be desirable.

Figure 6:
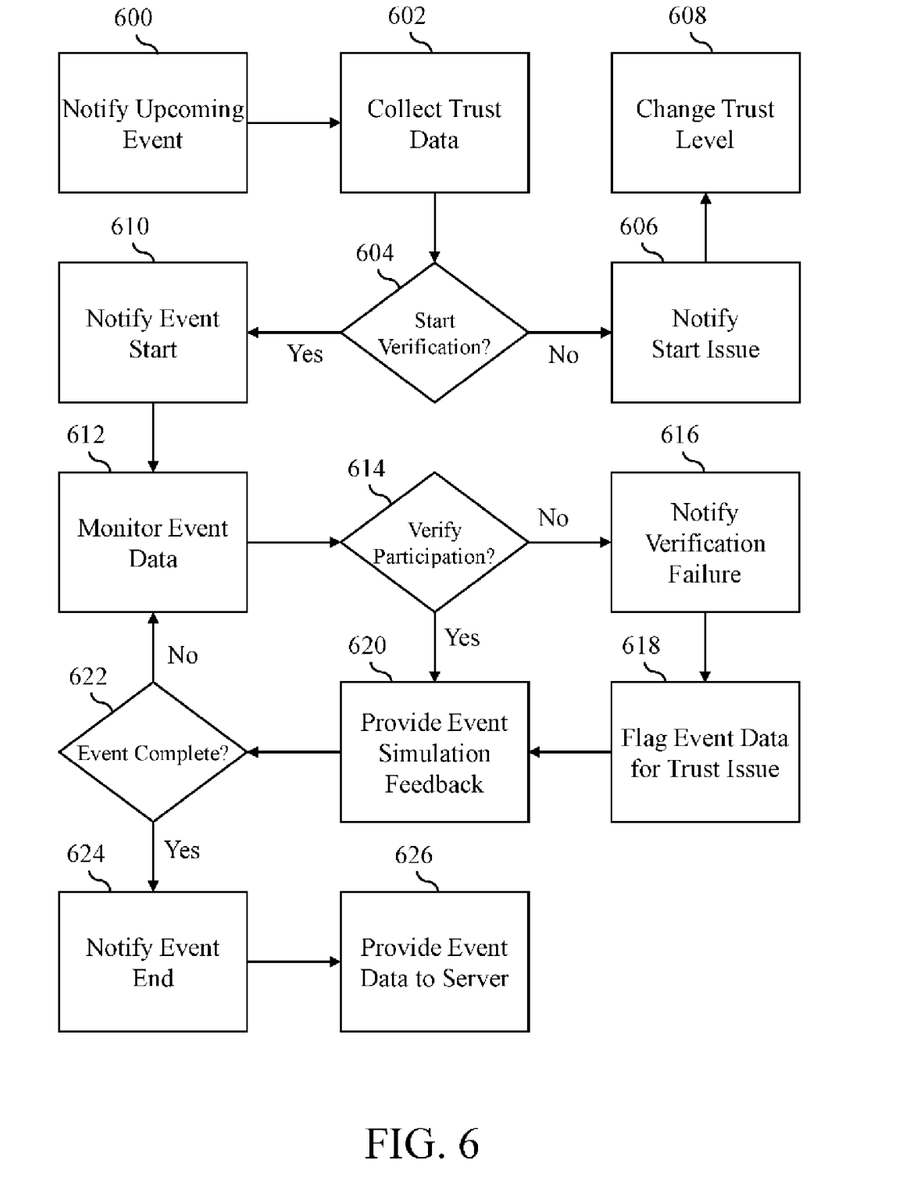
FIG. 6 is a flowchart of a set of steps that could be performed to execute and monitor a virtual event.

An advantageous aspect of the system that has previously been described is the ability to monitor event data from the network of participant devices (102) in order to validate participant results, and also to provide participant's with various feedback and other information through the event in order to enrich their experience. As an example, FIG. 6 shows a flowchart of a set of steps that could be performed to execute an event and monitor a plurality of participant devices (102). Leading up to an event, the system may provide notifications (600) of any upcoming events that a participant is registered for via their participant device. The participant may proceed to the starting location of their assigned route for the event, and may indicate when they are prepared to begin the event via their participant device (102). In some implementations, the participant device (102) may detect when it is within proximity of the starting point of the route, and within the time frame of the event start, and may automatically prompt the user to begin preparing for the event to begin.

In the time shortly before the event begins, the system may collect an updated set of trust data (602) that may include fingerprint data, facial recognition images, or other biometric and/or physiological data that may be used to verify the identity of the participant prior to the start. This may be compared to earlier collected trust data, such as the previously received (508) trust data. The system may then perform a pre-start verification (604) in order to verify the recently collected (602) trust data, verify the participant devices are functioning and that any required capabilities are enabled, and verify that the participant devices are positioned near the starting point and that the associated participant is configured to follow the route at that day and time. Where there is an issue with verification (604), the participant device (102) may notify (606) the participant of the issue via text, audio, or other information and provided instructions on how to address the issue. This may include voice commands and/or guided navigation to guide them to the start location, or voice and/or text commands indicating that additional facial images or fingerprint capture is needed. Where the verification issues cannot be addressed, the system may allow the participant to continue and participate in the event depending upon the event configurations, but may change (608) the trust level for that user. As an example, a participant that arrives too late to begin their event at the assigned time may be downgraded from high trust to moderate-trust, but may still participate in the event.

Where the system is able to verify (604) the participant's starting information, the system may notify (610) the participant when they should begin competing. This may include audio, text, or navigation feedback via a display and/or speaker of their participant devices (102), and may include a countdown, dramatic music, or display of a map showing upcoming portions of their route. After the event starts, the participant device (102) may continue to automatically provide event related data such as video or audio instructions to continue running straight, turn down a certain street, or take other navigational actions. The participant device (102) may also automatically provide voice, text, or video communication of the participant's pace, heartrate, location, position along the route, and other information. Additionally, the participant device (102) will begin to collect event data that may be monitored (612) by the participant devices (102), the server (100), or both. Collected event data may include GPS location information, images captured via the participant device, audio captured via the participant device, participant heart rate information, participant fingerprint information, accelerometer data, altitude data, and other information available via the participant devices (102).

Collected event data may be used on a continuous basis (e.g., as fast as processing capabilities allow, or based upon certain evaluation intervals) to verify (614) the participant's acceptable participation in the event, as will be described in more detail below. Where participation cannot be verified (614), the participant device (102) may notify (616) the participant of the verification failure and describe the issue (e.g., such as an audio message indicating the participant has deviated from the route, and display of navigation information to aid in returning to the route), and may also flag (618) that portion of the event data to indicate there was some verification issue. Flagged event data may be used to identify portions of the event where the participant may have deceived the system, and may require additional advanced verification. As another example, a set of participant event data that is associated with a higher than normal number of portions of flagged data may be subjected to advanced verification.

Where the event data can be verified (614), or after it has been flagged, the participant device (102) may provide event simulation feedback to the participant (102) based upon the participant's event data and/or the event data of a plurality of other participants. Event feedback may include audio announcement via a speaker or headphones, or display of text or images indicating events such as when the participant is about to pass, or be passed by, another participant (e.g., another participant that may currently be running that route, but may also have run the route on a previous day, or may be running a comparable route elsewhere in the world). Such cross-participant notices may be based upon other participant's event data that was previously tracked or is being tracked in parallel, or may be based upon "ghost runner" data that indicates how a yet-to-compete participant is likely to compete based upon their historical performance, training results, and other information available to the system. Audio feedback could also include playing the sound of footsteps when other participants are virtually nearby, and may also allow participants to share audio exchanges with each other (e.g., a first participant may be prompted to record a brief audio message that is passed to another nearby participant when they pass each other). Varying levels of real-time feedback may be available depending upon the participant device's (102) connection to a data network, and so may switch between being based upon live data from real data from other participants and being based upon simulated or "ghost runner" data as has been described. Feedback may also include information such as the participant's overall rank in the event, projected rank at time of finish, and other details.

Monitoring (612) and feedback (620) may be provided continuously throughout the event until the event completes (622), or until a participant either cancels the even or is removed from the event due to excessive verification failures or event data flagging that indicates attempts to deceive or falsify event results, or an unwillingness or inability to stay on the course or meet other event requirements. In either case, the participant device (102) may notify (624) the participant when the event ends and provide a summary of their final statistics, which may be based only on locally available information, or may be based on only partially available event data from all participants (e.g., such as where a participant is the first to compete in an event that will be executed over a ten day period with staggered start days). To the extent that any monitored (612) event data or information relating to verification (614) has not already been provided to the server (100), the participant device (102) may automatically provide such data the next time a network connection is available.

Figure 7:
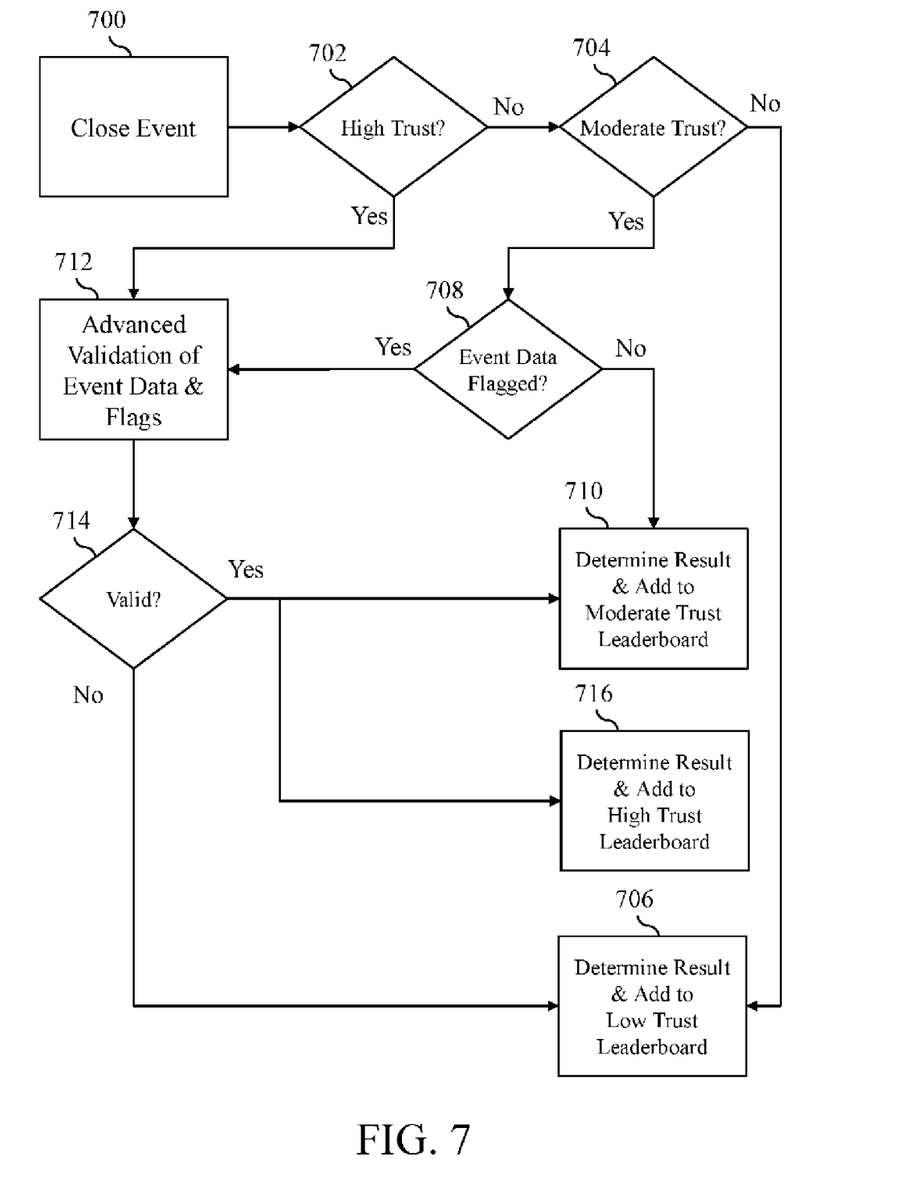
FIG. 7 is a flowchart of a set of steps that could be performed to validate and provide results of a virtual event.

As event data is received, the system may perform some additional verification of results and then may provide various leaderboards or result sets showing how a plurality of participants performed. As an example, FIG. 7 is a flowchart of a set of steps that could be performed to validate and provide results of a virtual event. When an event closes (700), or as individual participants in an event compete or finish competing in an event, the system may receive event data from participants and, depending upon the user type and any issues with the event data, add that user's results to one or more leaderboards. FIG. 7 shows one such example with three participant categories (e.g., high trust, moderate trust, low trust), though the number of categories may vary as has been described. As each participant's event data is received or finalized, the system may determine if a particular participant is registered as a high trust (702) participant or moderate trust (704) participant. If they are neither, they are a low-trust participant and their results may receive little or no additional evaluation, and their final results may be determined (706) and added to a low trust leaderboard where they are shown along with other low-trust participant's results.

Where a user is a moderate trust (704) user, the system may determine if there is any major flagging of event data (e.g., such as impossible event data that may indicate a runner was moving at speeds impossible to humans) or excessive flagging of event data for less serious issues, and where there is none my determine (710) that participant's final results and add them to a moderate trust leaderboard where they may be displayed amongst other moderate trust participant's results. Where event data flagging (708) exceeds a configured threshold for numbers or seriousness, the system may perform additional advanced verification of the event data either in its entirety, or focusing only on flagged portions. Advanced verification may include analyzing the participant's event data on the server (100) using a larger dataset of comparable metrics (e.g., historic event data for that course, event data from other participants on that course on the same day, etc.). Where advanced validation indicates that the participant was attempting to falsify their results or the results are otherwise misleading (714), the moderate trust participant may be downgraded to a low trust participant, and their final results may be determined (706) and added to the low trust leaderboard. Where advanced validation determines that the flagged portions of event data are valid (714) or do not adversely impact the results, the moderate trust participant's final results may be determined and added (710) to the moderate trust leaderboard.

Where a participant is categorized as high trust (702), the system may automatically perform advanced validation (712) on some or all of the event data, and may apply a more rigorous standard of validation as compared to that used for moderate trust participants. High trust participant's whose event data indicates an attempt to falsify results or serious errors that may adversely impact the accuracy of results may be downgraded to low trust users, and may have their results determined (706) and added to the low trust leaderboard. High trust users that are valid (714) after advanced validation may have their final results determined (716) and added to the high trust leaderboard. In some implementations, advanced validation (712), as well as some forms of local validation performed on participant devices (102), may utilize scalable cloud computing resources, machine learning, and other types of artificial intelligence that are possible with high processing capacity and access to broad data and analytics (e.g., advanced validation (712) may utilize data from a plurality of participant devices (100) to validate event data from a single participant device (100)).

As an example, some implementations may use a genetic algorithm to produce and refine one or more validation functions that check some or all of the event data for specific characteristics that indicate serious error or deception. Training of these genetic algorithms may be performed and the genetic algorithms may be refined over time using results from a plurality of participant devices (102), and may also be seeded with data from participant devices (102) that have been used during pre-planned training scenarios where a participant coordinating with a system administrator participates in an event while intentionally testing the capabilities of the system to monitor their progress (e.g., taking shortcuts, using a bicycle in a footrace, passing participant devices to a substitute participant, modifying their participant device to spoof GPS, heart rate, or other data). Seed data could be flagged in the system and used during evaluation of genetic algorithms to rate their ability to detect such activities, and will over time favor validation functions that perform well in identifying such deceptions.

Figure 8:
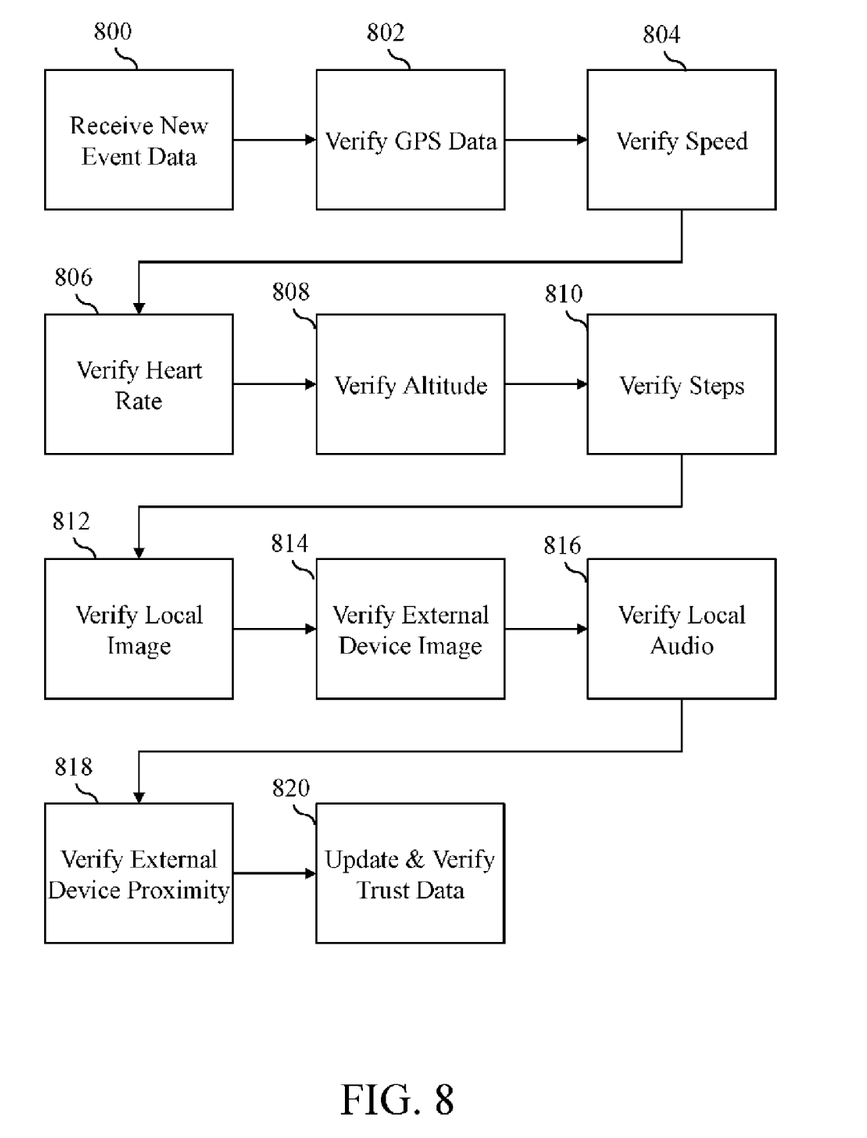
FIG. 8 is a flowchart of a set of steps that could be performed during validation and verification of results of a virtual event.

A variety of validation methods are possible with the depth and breadth of data available from the network of participant devices (102). As has been described, validation may occur at various stages, and may occur locally to the participant device (102) at the time of data creation, on the server (100) as the event data is received, and when the event closes and advanced validation is warranted for any reason. FIG. 8 is a flowchart showing a variety of validation steps that may be performed during some or all of the stages of validation, based on newly received (800) or available event data.

GPS data originating from the participant devices (102) may be verified (802) to determine whether the participant is on the configured route, and may also be used to determine a speed indicator showing the amount of distance covered between each of two or more GPS positions at discrete times. Extreme variances between GPS-based speed and accelerometer based speed may be resolved in favor of one dataset or the other, especially where sequential GPS coordinates indicate non-linear movement or excessive speeds, as these may indicate the GPS receiver (122) of the participant device (102) is inaccurate. GPS accuracy may also be verified based upon other position indicating data, such as where the user passes through a Wi-Fi zone that is capable of providing internet based location services, or passes by an external verification device (106) that is able to triangulate or otherwise determine the participant's location to provide a comparison to the GPS data. GPS data that is accurate within a configured threshold (e.g., 5-10 meters) may be considered valid, while GPS data falling outside that threshold may be flagged as erroneous or intentionally falsified data.

GPS data, accelerometer data, and/or step count data may be used to verify (804) the participant's speed. Where a determined speed exceeds reasonable limits for all humans (e.g., sustained speeds of greater than 10 m/s), or exceeds that participant's historic performance based on past events or training for the periods of time that the speed is maintained, the event data may be flagged to indicate erroneous or intentionally falsified data (e.g., such as where a participant switches to a bike during a footrace). In some implementations, a participant device may use one or more sensors to also determine a movement status of a participant holding the device, which may include using accelerometer and/or other data to determine that a participant is running, walking, jogging, or performing some other exercise (e.g., pedestrian motion), or riding a bicycle or other vehicle (e.g., vehicular motion), and such status may similarly be used to verify the participant's participation in the event.

Heart rate data may also be verified (806) to ensure that the participant is showing physiological signs of their current participation in the event. Where heart rate data does not correspond to sustained speeds based on that participant's historic data or averages across all participants, the event data may be flagged to indicate erroneous or intentionally falsified data. Other examples of heart rate data that may result in flagging include where heart rate falls below a certain competitive threshold (e.g., 100 bpm), or where heart rate falls from a high exertion heart rate to a much lower heart rate without a rest interval or gradual drop (e.g., a drop from 160 bpm to 110 bpm over the course of a minute or less).

Altitude data may also be verified (808) to ensure that it matches the anticipated altitude measurements for the participant device's GPS location and assumed position along the route, with altitude mismatches beyond a configured threshold being flagged as erroneous or intentionally falsified data.

Step counter data may also be verified (810) to ensure that it corresponds to a participant devices measurable speed from an accelerometer, GPS sequence, or other position and/or speed data. As an example, where a participant appears to maintain a high speed without counting steps, this may indicate that they are using another means to transport themselves other than running or walking, and such data may be flagged as erroneous or intentionally falsified. As another example, where the participant is showing a very high rate of steps but a low hear rate, this may also indicate intentional falsification of the data.

Images captured locally from the participant device (102) may also be verified (812). This may include prompting the user to capture a selfie for facial recognition, prompting the user to capture an image of the route ahead of themselves at a certain point along the route, or prompting the user to capture an image of a QR code, barcode, or other visual indicator placed along the path. Such image data can be used to verify the participant's identity, when compared to prior trust data provided by the user, or may be used to visually analyze and confirm their position on the route, or confirm their presence nearby a QR code or other visual indicator at the time of capture. As with prior examples, failure to capture or verify (812) a local image may flag the event data as erroneous or intentionally falsified.

Externally captured images (814) may also be verified, which may include images captured by an external verification device (106). This may include a camera positioned along a route, or at a single location shared by a plurality of routes, for a plurality of participants. The fixed position camera may be triggered by the server (100), or by short range wireless connection (e.g., Wi-Fi, Bluetooth) to a participant device (102), in order to capture images of a portion of the route when the participant should be present within the field of view. Where image analysis does not identify any object within the image that could be the participant, this may be flagged as erroneous or intentionally falsified data.

Local captured audio may also be verified (816), which may include a voice or text prompt instructing the user to speak a phrase into the participant device's (102) microphone, or may include the microphone passively picking up a transmitted sound or frequency projected by an external verification device (106) that is placed along the route. Audio recordings of the participant speaking may be used to verify the identity of the participant, as compared to previously captured voiceprints. Capturing a sound or frequency emitted by a device towards a position along the route provides a form of wireless positioning. As with prior examples, where such data cannot be verified (816) the event data may be flagged as erroneous or falsified.

External verification devices (106) may also be used to provide short-range proximity detection via Wi-Fi or Bluetooth, for example. Such verification (818) may include placing a Wi-Fi router or Low Energy Bluetooth beacon at a position shared by a plurality of participants. The participant device (102) may be configured to automatically connect to those devices when within range, and so provide an additional method of location verification. As with prior examples, where such data cannot be verified (818) the event data may be flagged as erroneous or falsified.

Verification may also include updates to trust data (820). This may include prompting the user to capture a new facial recognition image, provide a new fingerprint scan, provide a new voice sample, or provide other biometric or physiological information that may be used to verify their identity and compare to prior examples. Trust data verification (820) may be performed at various intervals, or may only be performed when data from the participant devices (102) warrants additional verification. As an example, where a smartwatch or wireless earbud detects that it has been removed and then replaced, this may indicate an attempt to switch participant's mid-event in order to gain a competitive advantage. The above verification steps are exemplary only, and varying implementations of a virtual event management system may not include all of the described steps. Additionally, other verification steps exist and are possible with varying capabilities of participant devices (102), and such variations and alternatives will be apparent to those of ordinary skill in the art in light of this disclosure.

II. Interfaces for Virtual Race Management System

While various examples of a virtual event management system have been described, other exists. Another such implementation is described below. One use of such a system is to enroll in a race or event that was created by an organization as a virtual alternative or backup to a traditional race. Another option is to join a publicly available race in which participants are matched with similarly skilled runners and cyclists from around the world.

Figure 9:
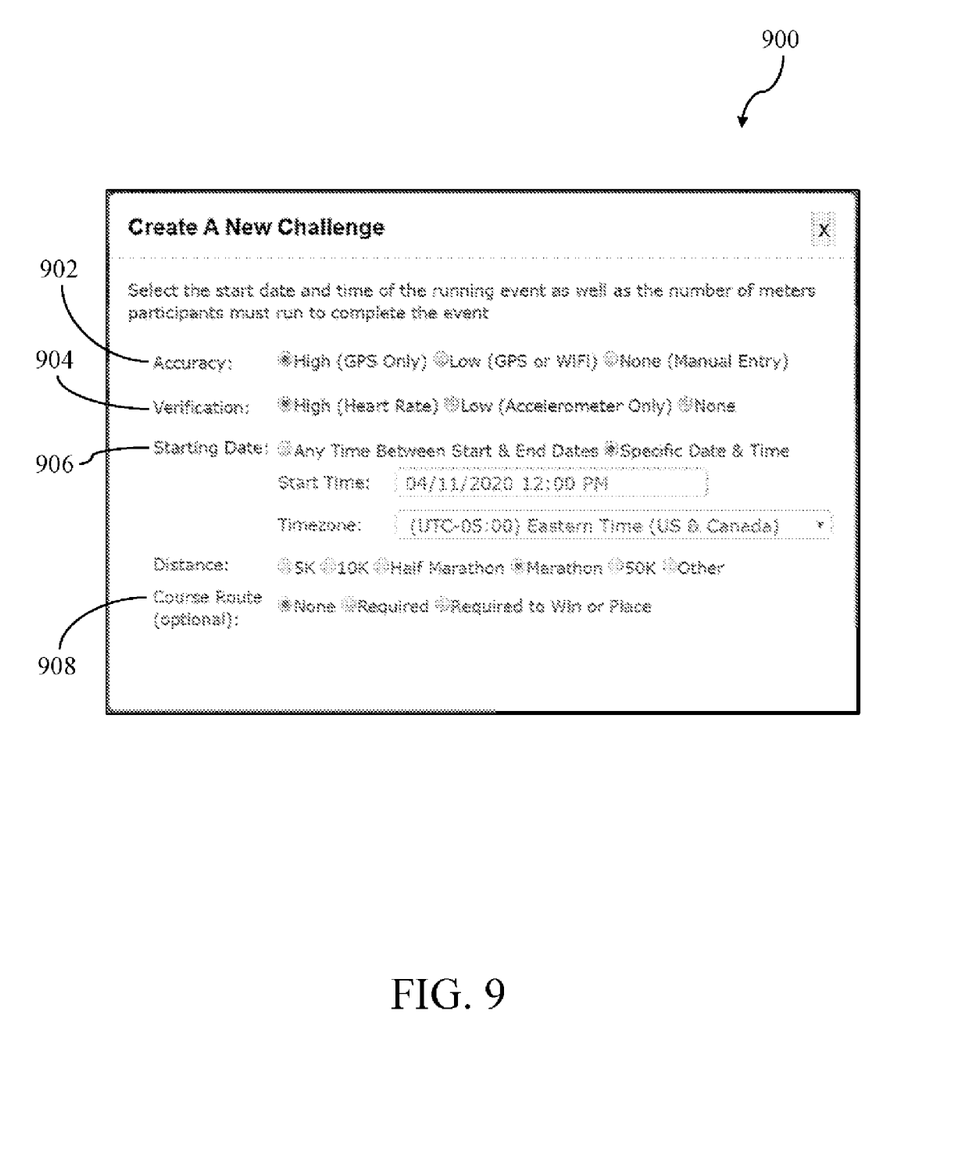
FIG. 9 is a screenshot of a graphical interface that may be used with the system of FIG. 1.

Race sponsors who wish to move their races online or augment a traditional race with virtual participants may do so through a software interface, such as the graphical interface (900) shown in FIG. 9, which may be used to specify various event configurations such as:

A. Accuracy Required (902): The validity of race results is determined by the accuracy of the location data the system is being fed. Good GPS accuracy can place the tracker within a few meters of the actual location. GPS is roughly twice as accurate as using Wi-Fi positioning.

i. High (GPS Only): GPS has the highest accuracy currently available but is sometimes sporadic in its application to wearable devices. However, GPS is usually available in smartphones which would allow most participants with smartphones and many with smartwatches to participate.

ii. Low (GPS or Wi-Fi): Allowing Wi-Fi to be used as an alternative to GPS in order to triangulate location allows for a broader range of devices to be used; however, using this technique is also less accurate.

iii. None (Manual Entry): Allows for self-reported data.

B. Verification Required (904): Admins can use the features of the wearable devices and smartphones to verify the data being collected.

i. High: For data to have high verification, the system must verify that the user participating in the challenge is the same user who registered for the challenge. This can be done through fingerprint readers or facial recognition. A high level of verification should also include consistent heart rate monitoring which would primarily only allow smartwatches.

ii. Low: A lower level of verification would include the use of gyroscopes and accelerometers to determine steps and activity.

iii. None: No verification required.

C. Course Map (908): If a specific course must be followed, the admin may use the mapping system to create an optional course route. This route will have specific waypoints to mark the turns which can be shown on the user's wearable device or spoken to the participant though optional audio devices. A race administrator may require that anyone wanting to place in the top tier of the race must use the course map while everyone else may choose any course they like. Likewise, to prevent participants from clustering around start and finish lines, the admin may not want to set a specific start time but instead allow participants to run the course over a period of days or weeks. To help verify that a user followed the course, the admin may pull up all the GPS coordinates that a participant recorded overlaid on the course map.

D. Start Time and Time zone (906): An admin-created race may include an optional start time and time zone. If this option is included, the race will start for all participants at the exact same time around the world. The point of this feature is to more accurately simulate the experience of an in-person race where all participants start at the same time. Another benefit is that participants can see in real-time their position in the race as well receive feedback on how far ahead and behind other participants are located. Removing this option will allow participants to choose when they want to participate between the set start and end dates set by the administrator.

E. Distance: The admin can choose a standard race distance: 5K, 10K, Half Marathon, Marathon, or 50K as well as creating a custom race distance.

Various training races may be available in addition registered races. Participants who want to compete in any of these races simply need to register using their wearable device and be prepared to compete at the specified start times. This will allow participants to train and receive feedback on how they are performing against their peer groups.

An additional feature that can be used with training races is that participant results can be used to pair users with like opponents using a matchmaking algorithm. This algorithm will match stronger competitors with like peers, and may also use factors such as geographic location and climate to match participants.

If a training race does not contain enough participants, additional participant bots can be generated using historical information for that type of race to help participants gauge their performance via in-race feedback and finishing position.

In order to register for a race, the participant must first download a software application to their smartphone, smartwatch, or other participant device (102). They will then need to create an account and potentially submit a fingerprint or facial image in or to verify their identity if required by a race administration. In addition, information such as age and gender may be required so that participants can be categorized into competing groups. Once this is complete, the system will evaluate the capabilities of the device and the settings approved by the user for use in determining which race events the participant may compete in.

After the user's account has been created and the user's device capabilities and setting evaluated, the user will be presented with a list of challenges that they can compete in. The user may select an event from the list and wait for the start date and/or time to compete.

Some races may be by invitation only and the race administrator can then invite participants or open the race to all participants and require that a user-specific code be entered before registration is complete.

As the race start date (and time if specified) approaches, the user will receive prompts alerting them to the competition dates. If all participants must start at the same time, additional prompts will be sent to the user as the starting time approaches. Ten minutes before the start of the race, the user will be prompted to warm up, the location detection systems will determine the coordinates of the user, and a countdown timer will begin.

If the race allows the user to choose the start time, they must only wait for the start date to arrive. After the date is reached, they can click a Start button to activate the location detection process and start their race.

If the race was set up to verify the identity of the participant, a fingerprint may be submitted or a facial image taken. This identification can be used to match with the initial fingerprint or image taken at registration.

If the race administrator has set a course route that must be followed, the user will not be able to start the race until they are within a few meters of the designated starting line. The user will then be given visual and auditory alerts as to the direction they are to proceed as well as updates regarding the course route throughout the race.

As the participant starts to race, the system will frequently check for location coordinates using GPS (or Wi-Fi if enabled). Depending upon the accuracy of the reading, the location is either kept and the coordinates used to calculate progress and meters per second, or the coordinates are discarded until the next reading.

Providing that the coordinates are kept, the system will check the heart rate, steps, activity, and any other sensors that the admin required to validate that the user is indeed still running or cycling. The system will also check to see if the user is progressing too fast. If any of these readings fail, the participant will be notified that they have a fixed period of time for a correct reading or they will be disqualified.

As long as the system determines that the user is progressing normally and their locations can be detected, it will check to see if the user is connected to the Internet. If so, it will send the current position and number of seconds since the start of the race. A web service will accept this data and compare it to the distance readings and time sent in by other participants to calculate user standings in the race as well as the distance between those in front and behind them. If the user is not connected to the Internet to get live information, historic data could be used to provide feedback to the participant and provide motivation.

Auditory alerts will also be available to those using headphones notifying the user of how far they have progressed and how far they have until the finish line. Additionally, footstep sounds can be played when they are passing another participant or a message stating "on your left" (potentially in the passing runner's own voice) when being passed. When crossing the finish line, cheers can be heard as well as the final time.

Once the system determines that the user has reached the required distance, it will notify the user to stop racing. It will then calculate the amount over the goal the user has completed and calculate the actual time the goal was reached using the participant's current meters per second ratio. If an Internet connection is available, this information will be synced with the web service to log the finish time and provide feedback to participants who are still competing. If an Internet connection is not available, the participant will be given a stated period of time to upload their data or their results will not be included on the official race leaderboard. If enabled, automatic updates will be posted to the participant's social medial accounts with final standings.

Participants may be asked to verify their identity using biometrics (fingerprint or image) at the conclusion of the race. Once all participants have finished or have been eliminated from the race, an official leaderboard will be available for all challenge participants and organizers to view race results.

Once the race has been completed, the participant may view their final standings in the form of a leaderboard as well as the GPS coordinates recorded while participating overlaid on a map of the area. The map will also show current speed and heart rate at each point. If an Internet connection had been available throughout the race, their position in the race would be available as well.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A virtual competitive event management system comprising a server in communication with a plurality of participant devices, the server comprising a processor, wherein the processor is configured to:
   (a) create a plurality of events based upon event input received from users, wherein each of the plurality of events comprises a set of requirements for participating in that event and an event time;
   (b) receive a request from a participant to participate in an event of the plurality of events, wherein the request comprises a description of one or more participant devices that are in the possession of the participant;
   (c) determine whether the participant meets the set of requirements for participating in the event based on the one or more participant devices in the possession of the participant;
   (d) register the participant for the event as a high trust participant when the participant meets the set of requirements;
   (e) receive a set of participant data generated by the one or more participant devices during the event time;
   (f) determine a speed of the participant based on a set of position data captured by a position sensor of the one or more participant devices during a portion of the event;
   (g) determine a movement status of the participant based on a set of movement data captured by an accelerometer of the one of more participant devices during the portion of the event, wherein the movement status is selected from the group comprising pedestrian motion and vehicular motion;
   (h) determine whether the participant can be verified as participating in the event based on the set of participant data and that the participant did not validly participate in the event when a step count during the portion of the event is not consistent with the speed during that portion of the event; and
   (i) cause a first leaderboard to display on one or more user devices, wherein the first leaderboard includes results of the event for a plurality of high trust participants that have been verified as participating in the event based on sets of participant data.

2. The system of claim 1, wherein the processor is further configured to:
   (a) register the participant for the event as a low-trust participant when the participant does not meet the set of requirements; and
   (b) cause a second leaderboard to display on one or more user devices, wherein the second leaderboard includes results of the event for a plurality of low-trust participants.

3. The system of claim 1, wherein the processor is configured to, at the event time:
   (a) provide a notification to the participant via the one or more participant devices indicating that the event is starting; and
   (b) receive a first portion of the set of participant data generated as the event is starting, wherein the first portion includes a first set of biometric data associated with the participant and generated by the one or more participant devices.

4. The system of claim 3, wherein the processor is configured to receive a second portion of the set of participant data generated during the event, wherein the second portion includes a second set of biometric data associated with the participant and generated by the one or more participant devices.

5. The system of claim 3, wherein the first set of biometric data includes one or more of:
   (a) a fingerprint captured via a fingerprint scanner of the one or more participant devices;
   (b) a heart rate captured via a heart rate sensor of the one or more participant devices;
   (c) a facial image captured via a camera of the one or more participant devices; or
   (d) a voice sample captured via a microphone of the one or more participant devices.

6. The system of claim 3, wherein the processor is configured to provide the notification to the participant at the event time, and only when a set of location data generated by a position sensor of the one or more participant devices matches a starting location of the event.

7. The system of claim 3, wherein the processor is configured to:
   (a) when registering the participant for the event as a high trust participant, receive a set of registration biometric data generated by the one or more participant devices;
   (b) after receiving the first set of biometric data, compare the first set of biometric data to the set of registration biometric data to determine whether each originates from the same person; and
   (c) when determining whether the participant can be verified as participating in the event, determine that the participant did not validly participate in the event when each set of biometric data does not originate from the same person.

8. The system of claim 1, wherein each of the plurality of events comprises an event route describing a geographical location where the event occurs, wherein the processor is configured to:
   (a) receive a set of location data generated by a position sensor of the one or more participant devices during the event;
   (b) verify that the set of location data substantially matches the event route;
   (c) receive a set of heart rate data captured via a heart rate sensor of the one or more participant devices during the event;
   (d) verify that the set of heart rate data falls within a configured threshold representative of competitive effort;
   (e) where the set of location data does not substantially match the event route, or where the set of heart rate data falls outside the configured threshold, flag that portion of the set of participant data; and
   (f) when determining whether the participant can be verified as participating in the event, determine that the participant did not validly participate in the event when the flagged portions of the set of participant data exceed a configured verification threshold.

9. The system of claim 8, wherein the one or more participant devices include:
(a) a smartphone that includes the position sensor; and
(b) a wearable smart device that includes the heart rate sensor.

10. The system of claim 1, wherein each of the plurality of events comprises an event route describing a geographical location where the event occurs, wherein the processor is configured to:
(a) determine a first location of a first participant device of the participant on the event route based on a first set of location data received from the first participant device;
(b) determine a second location of a second participant device of a second participant on the event route based on a second set of location data received from the second participant device;
(c) where the first location is within a configured proximate distance of the second location, receive a proximal device indicator from the second participant device indicating that the first participant device was detected nearby based upon a wireless communication between the first participant device and the second participant device; and
(d) when determining whether the participant can be verified as participating in the event, determine that the participant did not validly participate in the event when the proximal device indicator is not received.

11. The system of claim 1, wherein each of the plurality of events comprises an event route describing a geographical location where the event occurs, and a maximum number of simultaneous participants allowed on the event route, wherein the processor is further configured to:
(a) determine the event time separately for each of a plurality of participants based on the maximum number of simultaneous participants allowed on the event route; and
(b) for each of the plurality of participants, provide a notification to that participant via the one or more participant devices indicating that the event is starting at that participant's event time.

12. The system of claim 1, wherein a plurality of participants are registered for the event, and wherein at least some of the plurality of participants are registered for the event with different event times, different event routes having the substantially the same overall length, or both, wherein the processor is further configured to:
(a) during the event for the participant, identify one or more past participants that have completed the event at a different event time, different event route, or both;
(b) receive a set of location data generated by a position sensor of the one or more participant devices during the event and determine an event timeline based on the set of location data and an elapsed time for the participant during the event;
(c) determine a set of proximate ghost runners based on event timelines of the one or more past participants and the event timeline of the participant; and
(d) cause the one or more participant devices to provide an audio indication when the participant's position on the event timeline passes that of a ghost runner of the set of proximate ghost runners.

13. The system of claim 12, further comprising:
(a) when causing the one or more participant devices to provide the audio indication, receive an audio recording of the participant from the one or more participant devices; and
(b) provide the audio recording to one or more participant devices of the ghost runner that was passed.

14. A method comprising, with a processor that is in communication with a plurality of participant devices:
(a) creating a plurality of events based upon event input received from users, wherein each of the plurality of events comprises a set of requirements for participating in that event and an event time;
(b) receiving a request from a participant to participate in an event of the plurality of events, wherein the request comprises a description of one or more participant devices that are in the possession of the participant;
(c) determining whether the participant meets the set of requirements for participating in the event based on the one or more participant devices in the possession of the participant;
(d) registering the participant for the event as a high trust participant when the participant meets the set of requirements;
(e) receiving a set of participant data generated by the one or more participant devices during the event time;
(f) determining a speed of the participant based on a set of position data captured by a position sensor of the one or more participant devices during a portion of the event;
(g) determining a movement status of the participant based on a set of movement data captured by an accelerometer of the one or more participant devices during the portion of the event, wherein the movement status is selected from the group comprising pedestrian motion and vehicular motion;
(h) all determining whether the participant can be verified as participating in the event based on the set of participant data and that the participant did not validly participate in the event when a step count during the portion of the event is not consistent with the speed during that portion of the event; and
(i) causing a first leaderboard to display on one or more user devices, wherein the first leaderboard includes results of the event for a plurality of high trust participants that have been verified as participating in the event based on sets of participant data.

15. The method of claim 14, further comprising, with the processor:
(a) registering the participant for the event as a low-trust participant when the participant does not meet the set of requirements; and
(b) causing a second leaderboard to display on one or more user devices, wherein the second leaderboard includes results of the event for a plurality of low-trust participants.

16. The method of claim 14, further comprising, with the processor and at the event time:
(a) providing a notification to the participant via the one or more participant devices indicating that the event is starting; and
(b) receiving a first portion of the set of participant data generated as the event is starting, wherein the first portion includes a first set of biometric data associated with the participant and generated by the one or more participant devices.

17. The method of claim 16, further comprising, with the processor:
(a) when registering the participant for the event as a high trust participant, receiving a set of registration biometric data generated by the one or more participant devices;

(b) after receiving the first set of biometric data, comparing the first set of biometric data to the set of registration biometric data to determine whether each originates from the same person; and (c) when determining whether the participant can be verified as participating in the event, determining that the participant did not validly participate in the event when each set of biometric data does not originate from the same person.

18. The method of claim 14, wherein each of the plurality of events comprises an event route describing a geographical location where the event occurs, and a maximum number of simultaneous participants allowed on the event route, the method further comprising, with the processor:

(a) determining the event time separately for each of a plurality of participants based on the maximum number of simultaneous participants allowed on the event route; and (b) for each of the plurality of participants, providing a notification to that participant via the one or more participant devices indicating that the event is starting at that participant's event time.

19. A virtual competitive event management system comprising a server in communication with a plurality of participant devices, the server comprising a processor, wherein the processor is configured to:

(a) create a plurality of events based upon event input received from users, wherein each of the plurality of events comprises a set of requirements for participating in that event, an event time, and an event route describing a geographical location where the event occurs;

(b) receive a request from a participant to participate in an event of the plurality of events, wherein the request comprises a description of one or more participant devices that are in the possession of the participant;

(c) determine whether the participant meets the set of requirements for participating in the event based on the one or more participant devices in the possession of the participant;

(d) register the participant for the event as a high trust participant when the participant meets the set of requirements;

(e) at the event time, provide a notification to the participant via the one or more participant devices indicating that the event is starting;

(f) receive a first set of biometric data generated as the event is starting, wherein the first set of biometric data is associated with the participant and generated by the one or more participant devices;

(g) receive a set of location data generated by a position sensor of the one or more participant devices during the event and verify that the set of location data substantially matches the event route;

(h) receive a set of heart rate data captured via a heart rate sensor of the one or more participant devices during the event and verify that the set of heart rate data falls within a configured threshold representative of competitive effort;

(i) determine whether the participant can be verified as participating in the event based on the set of location data substantially matching the event route, the set of heart rate data falling within the configured threshold, and the first set of biometric data matching a second set of biometric data provided by the participant at the time of registration; and (j) cause a first leaderboard to display on one or more user devices, wherein the first leaderboard includes results of the event for a plurality of high trust participants that have been verified as participating in the event.

\* \* \* \* \*